United States Patent [19]

Hamilton

[11] 4,107,941
[45] Aug. 22, 1978

[54] ENVIRONMENTAL CONTROL SYSTEM

[76] Inventor: Stuart R. Hamilton, 3 Bent Hill Dr., Framingham, Mass. 01701

[21] Appl. No.: 636,075

[22] Filed: Nov. 28, 1975

[51] Int. Cl.² .................................................. F25D 17/04
[52] U.S. Cl. .................................. 62/186; 236/1 R; 236/49
[58] Field of Search ................. 62/126, 157, 132, 162, 62/186; 236/1 R, 49; 165/13, 16; 340/258 A, 222, 419, 261

[56] References Cited

U.S. PATENT DOCUMENTS

| | | | |
|---|---|---|---|
| 1,720,723 | 7/1929 | Dodge | 236/1 |
| 2,091,562 | 8/1937 | Palmer | 165/16 |
| 2,094,738 | 10/1937 | Dunham et al. | 236/1 |
| 2,206,009 | 6/1940 | Cummings | 236/49 |
| 3,011,718 | 12/1961 | Joerren | 236/1 |
| 3,242,486 | 3/1966 | Corbell | 340/258 A |
| 3,352,490 | 11/1967 | Dalzell et al. | 236/68 B |
| 3,383,678 | 5/1968 | Palmer | 340/258 A |
| 3,456,878 | 7/1969 | McBride, Jr. et al. | 236/1 |
| 3,680,073 | 7/1972 | Humphrey et al. | 340/258 A |
| 3,691,558 | 9/1972 | Hoard et al. | 340/258 A |
| 3,713,126 | 1/1973 | Stettner | 340/261 |
| 3,934,797 | 1/1976 | Perlmutter | 236/49 |

*Primary Examiner*—Martin P. Schwadron
*Assistant Examiner*—G. L. Walton

[57] ABSTRACT

An environmental control system for enclosures that accommodate human activities. The system includes an environmental conditioner such as a heating or air conditioning unit for supplying temperature conditioned air to the enclosure and a sensor for detecting the presence of humans occupying the enclosure. In response to an absence of humans within the enclosure, the sensor fails to produce a signal causing a control system to either reduce or terminate the flow of conditioned air into the enclosure and thereby reduce the level of energy consumed by the unoccupied enclosure.

7 Claims, 1 Drawing Figure

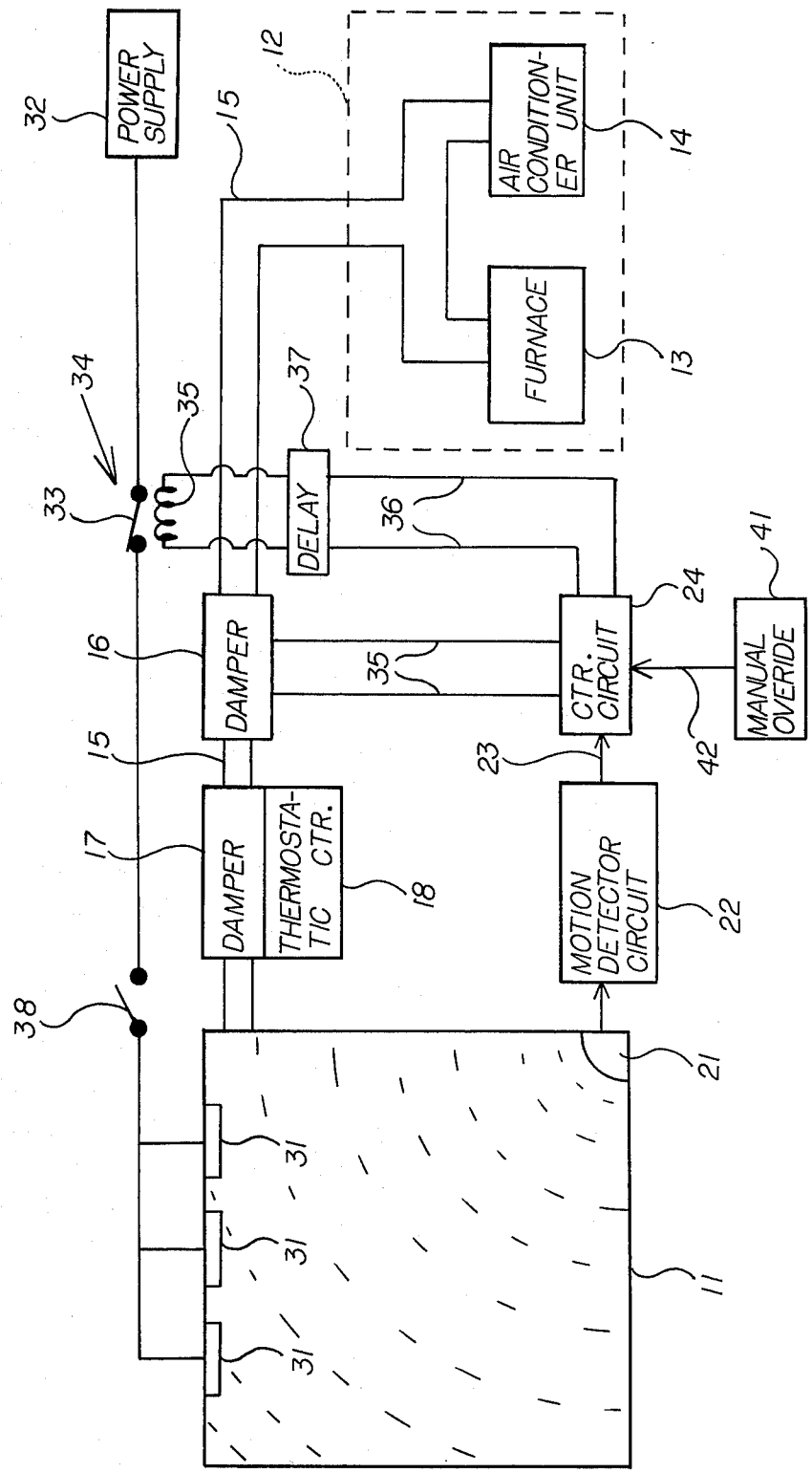

ENVIRONMENTAL CONTROL SYSTEM

BACKGROUND OF THE INVENTION

This invention relates generally to an energy conserving environmental control system and, more particularly, to an environmental control system in which temperature control in selected areas is automatically controlled in response to the presence or absence therein of human occupants.

The recent energy crisis has accentuated the importance of energy conservation. Some of the most significant consumers of energy are the environmental conditioning systems which either heat or cool the air within buildings located in climates exhibiting uncomfortable air temperatures. In efforts to reduce energy consumption for these purposes both public and private sectors of the Government have engaged in campaigns admonishing the public to conserve fuel by increasing the quality of temperature insulation in floors, walls and ceilings of both new and existing dwellings, accepting less than physically optimum air temperatures, eliminating or reducing environmental conditioning in unused rooms, etc. Although the latter method can effectively reduce energy consumption in many situations there are certain circumstances in which human intervention cannot be relied upon to adjust thermostatic controls in unoccupied portions of a building. For example, many public and institutional buildings have classrooms, general purpose rooms, auditoriums, etc., that are utilized by diverse groups which are directed by individuals who cannot be relied upon to alter thermostatic settings after use of a given facility has been completed. Furthermore, such rooms often are used under varying schedules and therefore are not susceptible to automatically timed environmental control systems.

The object of this invention, therefore, is to provide an environmental control system in which the air temperature in a given enclosure is automatically controlled in response to human presence therein.

SUMMARY OF THE INVENTION

The present invention encompasses an environmental control system for enclosures that accommodate human activities. The system includes an environmental conditioner such as a heating or air conditioning unit for changing natural environmental conditions by supplying conditioned air to the enclosure and a sensor such as a motion detector for detecting the presence of humans occupying the enclosure. In response to an absence of humans within the enclosure, the detector fails to produce a signal causing a control system to either reduce or terminate the flow of conditioned air into the enclosure and thereby reduce the level of energy consumed by the unoccupied enclosure.

In a featured embodiment of the invention the environmental conditioner comprises a lighting system for controlling the environmental light level within the enclosure and also connected to the human presence responsive control system. In response to an absence of human presence in the enclosure, the lighting system is de-energized after a given time delay. This action in combination with the reduction in the flow of conditioned air effects a further reduction in energy consumption.

DESCRIPTION OF THE DRAWING

These and other objects and features of the present invention will become more apparent upon a perusal of the following description taken in conjunction with the accompanying drawing which is a schematic block diagram illustrating a preferred embodiment of the invention.

DESCRIPTION OF THE PREFERRED EMBODIMENT

Referring now to the drawing, there is shown an enclosure 11 that can be, for example, a room for accommodating groups of people in a public or institutional building. Temperature controlled air is supplied to the enclosure 11 from an environmental conditioner unit 12 that includes both a furnace 13 for supplying heated air and an air conditioning unit 14 for supplying cooled air. Disposed in an air supply duct 15 extending between the enclosure 11 and the conditioner unit 12 is an electrically controlled damper 16. Also located in the duct 15 in series with the electrically controlled damper 16 is a second damper 17 responsive to a conventional thermostatic control 18.

The presence of humans within the enclosure 11 is monitored by a presence sensor 21 which preferably is a motion detector of the type, for example, disclosed in U.S. Pat. Nos. 3,512,155 and 3,805,262. The detector 21 supplies a motion detector circuit 22 with a signal having a level dependent upon the degree of motion detected in the enclosure 11. In response to a predetermined threshold level of detected motion, the motion detector circuit 22 produces on line 23 an output signal indicating human presence in the enclosure 11. Typical detector circuits are disclosed in U.S. Pat. Nos. 3,242,486 and 3,383,678. The output signal on line 23 is received by an override control circuit 24 that in turn produces on line 25 a control signal for the electrically controlled damper 16.

Mounted on the ceiling of the enclosure 11 are a plurality of conventional light fixtures 31 for controlling the environmental light level therein. Power for energizing the light fixtures 31 is supplied from a power source 32 through the normally open contacts 33 of a relay 34. The winding 35 of the relay 34 is energized by an output signal on line 36 from the control circuit 24. The signal on line 36 is delayed in a delay circuit 37.

During normal use of the enclosure 11 the air temperature therein is regulated by conditioned air flow from the environmental conditioner unit 12 under the control of the thermostatically controlled damper 17. Obviously, during cold periods the furnace unit 13 is activated to supply heated air while in hot periods the air conditioning unit 14 is activated to supply cool air. Energization of the light fixtures is effected by operation of a manually controlled switch 38. The motion of occupants of the enclosure 11 is detected by the detector 21 causing the detector circuit 22 to produce an output signal on line 23. That output signal de-activates the control circuit 24 which produces no control signals on lines 25 and 26. Consequently, the biased open control damper 16 remains open and the normally closed switch contacts 33 remain closed insuring conditioned air flow to the enclosure 11 through the dampers 16 and 17, and energization of the lights 31 through the switches 34 and 38. However, once the enclosure 11 has been vacated, the absence of motion therein is detected by the detector 21 resulting in the absence of an output signal on line 23 from the detector circuit 22. This absence of an output signal on line 23 activates the override control circuit 24 resulting in the presence of control signals on lines 25 and 36. The control signal on line 25 effects closure of the damper 16 interrupting the flow of temperature conditioned air to the enclosure 11 regardless of the operating position of the thermostatically controlled damper 17.

In certain instances, de-activation of the control circuit 24 may be beneficial. For example, after an extended period of non-use, preconditioning of the enclosure 11 for a given period prior to occupation may be desirable. Such preconditioning will establish predetermined environmental conditions in the enclosure at the outset of human use. To provide for this contingency a manual override system 41 can be manually actuated to produce a signal on a line 42 that de-activates the control circuit 24 and render the thermostatic control 18 independently effective. Thus, for example, after an overnight period of non-use, the override 41 can be actuated an hour or so before occupation of the enclosure 11 to establish therein a desired working temperature.

Produced simultaneously with the signal on line 25 is a control signal on line 36. After being delayed by the circuit 37 for a period of, for example, twenty minutes the signal on line 36 energizes the relay 34 to open the normally closed contacts 33 and thereby de-energize the lighting fixtures 31. The delay circuit 37 prevents inadvertent de-energization of the lights 31 during transient periods when the sensor 21 fails to produce a signal although the enclosure 11 is occupied. Thus, during periods of non-use, the flow of temperature conditioned air to the enclosure 11 and lighting thereof are both automatically terminated to eliminate the wasteful use of energy.

Obviously many modifications and variations of the present invention are possible in light of the above teachings. For example, the control circuit 24 could be used to merely decrease rather than eliminate the flow of conditioned air through the damper 16 or could provide output signals that directly de-energize the environmental conditioner units 13 and 14. Also, other environmental conditions such as humidity could be controlled and other presence sensors such as infra-red detectors could be employed. It is to be understood, therefore, that the invention can be practiced otherwise than as specifically described.

What is claimed is:

1. An environmental control system comprising:
   an enclosure for accommodating human activities;
   an environmental conditioner means for inducing change in the natural environmental temperature conditions within said enclosure;
   human presence detector means for distinguishing between the presence or absence of humans within said enclosure; and
   thermostatic control means for causing said conditioner means to establish a given temperature in said enclosure in response to detection of any human presence by said detector means and an override control means to establish a substantially different temperature in said enclosure in response to a total evacuation of the enclosure as detected by said detector means.

2. An environmental control system according to claim 1 wherein said conditioner means comprises air conditioner means for supplying temperature conditioned air to said enclosure.

3. An environmental control system according to claim 2 wherein said detector means comprises motion detector means for detecting motion of humans present in said enclosure.

4. An environmental control system according to claim 3 wherein said control means comprises flow control means for reducing the flow of conditioned air into said enclosure in response to the absence of motion therein.

5. An environmental control system according to claim 4 wherein said flow control means increases the flow of conditioned air into said enclosure in response to the presence of motion therein.

6. An environmental control system according to claim 5 wherein said environmental conditioner means comprises heating means for supplying heated air to said enclosure.

7. An environmental control system according to claim 5 wherein said environmental conditioner means comprises cooling means for supplying cooled air to said enclosure.

* * * * *